United States Patent [19]

Ray

[11] Patent Number: 4,858,372
[45] Date of Patent: Aug. 22, 1989

[54] FISH BASKET

[76] Inventor: Lawrence J. Ray, 1207 Madison St., Darlington, Wis. 53530

[21] Appl. No.: 295,137

[22] Filed: Jan. 9, 1989

[51] Int. Cl.<sup>4</sup> ............................................. A01K 97/00
[52] U.S. Cl. ........................................... 43/55; 43/17.5
[58] Field of Search ..................................... 43/55, 17.5

[56] References Cited

U.S. PATENT DOCUMENTS

| | | | |
|---|---|---|---|
| 756,438 | 4/1904 | Uhlenhart | 43/17.5 |
| 2,738,609 | 3/1956 | Reed | 43/17.5 |
| 3,478,463 | 11/1969 | Ruter | 43/55 |
| 3,559,329 | 2/1971 | Chiu | 43/55 |
| 3,919,803 | 11/1975 | Manguso | 43/55 |
| 4,070,786 | 1/1978 | Dunham | 43/55 |
| 4,251,943 | 2/1981 | Sawlsville | 43/55 |
| 4,475,301 | 10/1984 | Wortham | 43/17.5 |
| 4,570,374 | 2/1986 | Baxley | 43/55 |

Primary Examiner—Gene P. Crosby
Attorney, Agent, or Firm—Leon Gilden

[57] ABSTRACT

A fish basket is set forth wherein the fish basket is immersible in water during a fishing procedure. The fish basket includes an elongate basket with an outwardly tapering lower portion and an inwardly tapering upper portion to effect a constricted entrance to enable fish to be positioned within the lower portion of the basket to enable such fish to swim thereabout without access to the upper portion of the basket. The fish basket further includes an outer flotation rim removably mounted relative to the fish basket with a circumferential series of illumination members for attracting fish during periods of diminished light, such as in the evening hours.

8 Claims, 1 Drawing Sheet

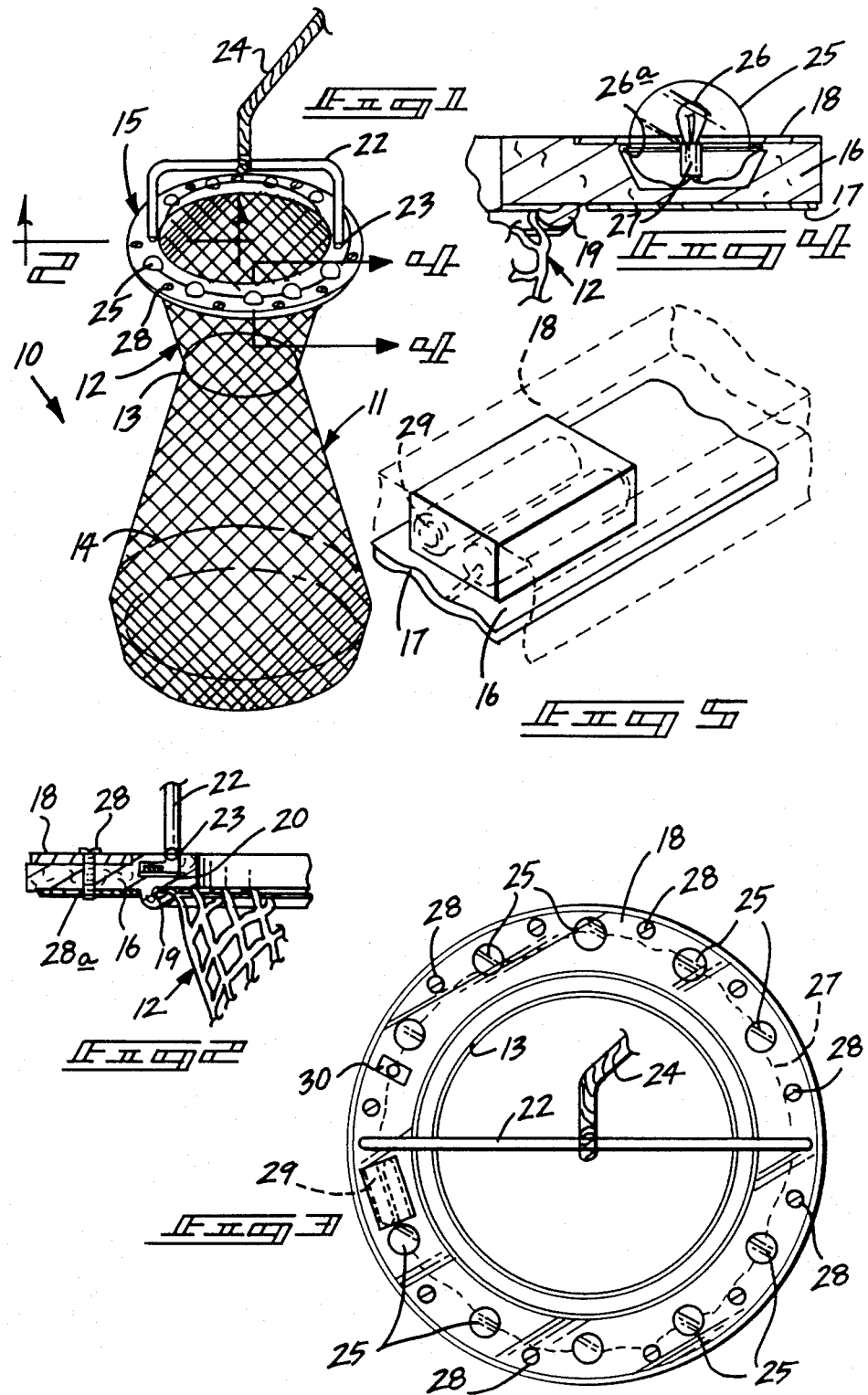

FISH BASKET

BACKGROUND OF THE INVENTION

1. Field of the Invention

The use of fish securement devices is well known in the prior art wherein the present invention sets forth a new and improved fish basket for maintaining fish that have been caught in a predetermined area of the basket while further providing selectively utilizable illumination members for attracting fish during hours of diminished light.

2. Description of the Prior Art

The use of fish securement devices, such as baskets and the like, is well known in the prior art. The prior art devices have included various members to constrict and deter fish from escaping from a basket, having been once inserted therein. For example, U.S. patent 3,559,329 to Chiu sets forth an elongate basket with a central opening formed as a constricted funnel to prevent escape of fish once positioned therewithin. The Chiu patent fails to provide the flotation ring and illumination members as set forth by the instant invention.

U.S. patent 3,919,803 to Manguso sets forth a flotation fish basket with a buoyancy ring to maintain the basket proximate a water surface level. The Manguso patent utilizes a flotation flap at the entrance, but does not provide the restricted entrance within the mesh of the basket, as set forth by the instant invention.

U.S. patent 4,070,786 to Dunham sets forth a fish receiving hopper with a downwardly descending chute for containment of fish therein. The hopper of the Dunham patent is not intended for submersed use, as is the instant invention.

U.S. patent 4,251,943 to Sawlsville sets forth a fish trap with a flotation collar which may include reflective devices thereon to facilitate recovery of the trap but does not provide means or basis for attracting fish, as does the instant invention.

U.S. patent 4,570,374 to Baxley sets forth a flotating fish receptacle including a plurality of inwardly extending baffles through the fish insertion entrance to prevent fish from escaping.

As such, it may be appreciated that there is continuing need for a new and improved fish basket wherein the same addresses both the problems of effectiveness and ease of use in securement and attraction of fish.

SUMMARY OF THE INVENTION

In view of the foregoing disadvantages inherent in the known types of fish baskets now present in the prior art, the present invention provides a fish basket wherein the same may be compactly stored when not in use and be further easily and efficiently extended for flotation about a water surface to attract and secure fish therein. As such, the general purpose of the present invention, which will be described subsequently in greater detail, is to provide a new and improved fish basket which has all the advantages of the prior art fish baskets and none of the disadvantages.

To attain this, the present invention comprises an elongate fish basket including a lowermost portion extending downwardly and outwardly for securement of fish therein with a tapered entrance and upwardly extending outwardly flaring upper portion of the basket for directing fish from the upper portion to the lower portion to prevent their escape. Further, the basket includes a flotation collar sealingly securing a series of illumination members selectively utilized during periods of diminished light for attracting fish to the proximate area of the basket.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fish basket which has all the advantages of the prior art fish baskets and none of the disadvantages.

It is another object of the present invention to provide a new and improved fish basket which may be easily and efficiently manufactured and marketed.

It is a further object of the present invention to provide a new and improved fish basket which is of a durable and reliable construction.

An even further object of the present invention is to provide a new and improved fish basket which is susceptible of a low cost of manufacture with regard to both materials and labor, and which accordingly is then susceptible of low prices of sale to the consuming public, thereby making such fish baskets economically available to the buying public.

Still yet another object of the present invention is to provide a new and improved fish basket which provides in the apparatuses and methods of the prior art some of the advantages thereof, while simultaneously overcoming some of the disadvantages normally associated therewith.

Still another object of the present invention is to provide a new and improved fish basket wherein the same provides a constricted floating fish basket for securement of fish therein and further utilizes illuminating fish attracting members to enhance the act of fishing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic view taken along the lines 2—2 of FIG. 1 in the direction indicated by the arrows.

FIG. 3 is a top plan view of the instant invention.

FIG. 4 is an orthographic view taken along the line 4—4 of FIG. 1 in the direction indicated by the arrows.

FIG. 5 is an isometric illustration of the battery pack utilized by the instant invention.

DESCRIPTION OF THE PREFERRED EMBODIMENT

With reference now to the drawings, and in particular to FIGS. 1 to 5 thereof, a new and improved fish basket embodying the principles and concepts of the present invention and generally designated by the reference numeral 10 will be described.

More specifically, it will be noted that the fish basket apparatus 10 essentially comprises a collapsible mesh net typically constructed of wire of fabric including a lower chamber 11 of a generally truncated conical configuration interfacing with an upper chamber 12 of a generally inverted conical configuration defining a constricted opening maintained in configuration by an upper circumferential horizontal ring 13 parallel to and spaced above a lower horizontal rigid circumferential ring 14 maintaining the lower chamber 11 in the desired configuration, as illustrated in FIG. 1.

A flotation ring 15 is integrally secured to the upper terminal end 20 of the fish net including an underlining forwardly positioned continuous circumferential plate 17 underlying and parallel to an overlying apertured plate 18 with the buoyancy ring 16 typically formed of high density foam and the like sandwiched therebetween wherein the circumferential plate 17 is integrally formed and laminated to the buoyancy ring 16 with the overlying aperture plate 18 removably secured thereto by means of elongate threaded connectors 28. A constricted hook portion 19 is positioned inwardly and adjacent the circumferential plate 17 for securement of the upper terminal edge of the net 12. Positioned adjacent and interiorly of the overlying apertured plate 18 is a circumferential recess for securement of the handle 22 therewithin. The handle 22 has formed thereto a lower terminal foot secured to the interior of the recess with the handle formed with a pivot 23 adjacent the aforenoted foot to enable pivotment of the handle relative to the flotation ring 15. A tether line 24 is secured to the handle that may be in turn fastened to a dock or boat, as utilized in the fishing event.

A series of transparent hemispherical domes 25 project upwardly through complementarily shaped apertures formed in the apertured plate 18. The hemispherical domes include outwardly extending lips 25a that project outwardly of the domes for positionment under the apertured plate 18 such that when the plate 18 utilizes the series of threaded connectors 28, a water-tight seal is effected by means of the high density polymeric-type material utilized in the buoyancy ring and its compression adjacent the surface of the lip 25a. A water-tight seal is, in fact, effected about the entire underlying surface of the aperture plate 18 and its cooperation with the buoyancy ring 16.

Each of the transparent hemispherical domes 25 overlie an associated illumination bulb 26, each connected in series by electrical wire 27, to an electrical source provided by a battery pack 29 positioned in sealing water-tight engagement underlying the apertured plate and including a water-proof on/off switch 30 of conventional construction.

Accordingly, it may be appreciated that the battery pack 29, electrical wire 27, the associated bulbs and their socket arrangements 26a are all maintained in a sealing water-tight condition preventing water intrusion and thereby enabling the selective illumination of the various bulbs 26 by actuation of the water-proof switch 30. During diminished light conditions, therefore, the instant invention provides not only containment and confinement of fish that have been caught within the lower chamber 11, but also provides the benefit of attracting additional fish by attracting fish to the light sources provided by the series of bulbs 26.

The manner of usage and operation of the instant invention therefore should be understood from the above description, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fish basket apparatus, comprising,
   a net member including an elongate net formed with a lower chamber and an upper chamber axially aligned with the lower chamber, and
   an opening between said upper and lower chamber including an upper horizontal ring member defining said opening, and
   a lower horizontal ring member spaced parallel to and below said upper horizontal ring member to maintain the configuration of said lower chamber, and
   a flotation ring secured to an upper terminal circumferential end of the upper chamber;
   said flotation ring including a circumferential flange extending outwardly of said upper chamber with fish attracting means directed outwardly from within said flotation ring for attracting fish to said apparatus, and wherein said fish attracting means includes a plurality of illumination devices.

2. A fish basket apparatus as set forth in claim 1 wherein each of said illumination devices includes a circumferential apertured plate positioned along an exterior upper surface of the flotation ring with a series of apertures therethrough, and a plurality of transparent domes extending outwardly of said apertures wherein said aperture plate sealingly secures said domes against a buoyancy ring, said buoyancy ring including an underlying circumferential plate aligned with said apertured plate with a plurality of fasteners connecting said aperture plate of said circumferential plate and extending through said buoyancy ring.

3. A fish basket apparatus as set forth in claim 2 wherein an illumination bulb is contained interiorly of each of said transparent domes and communicating with one another by an electrical wire.

4. A fish basket apparatus as set forth in claim 3 wherein a battery pack is positioned underlying said apertured plate and electrically communicating with each of said bulbs for selectively providing electrical power to illuminate each of said illumination bulbs with a water-proof switch positioned on said apertured plate for selectively providing electrical energy to each of said bulbs.

5. A fish basket apparatus as set forth in claim 4 wherein said apertured plate is spaced overlying and parallel to said circumferential plate.

6. A fish basket apparatus as set forth in claim 5 further including a constricted hook portion positioned adjacent said circumferential plate for securement of the upper terminal end of the upper chamber.

7. A fish basket apparatus as set forth in claim 6 further including a circumferential recess positioned adjacent said apertured plate for securement of terminal ends of a handle.

8. A fish basket apparatus as set forth in claim 7 wherein each of said domes includes an outwardly extending lip of a diameter greater than an associated diameter of apertures accepting each of said domes.

* * * * *